(12) United States Patent
Danilak

(10) Patent No.: US 7,571,373 B1
(45) Date of Patent: Aug. 4, 2009

(54) POST-TRANSMISSION DISK ERROR CORRECTION

(75) Inventor: Radoslav Danilak, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1087 days.

(21) Appl. No.: 10/913,742

(22) Filed: Aug. 6, 2004

(51) Int. Cl.
*G11C 29/00* (2006.01)
(52) U.S. Cl. .................. 714/770; 714/758; 714/749
(58) Field of Classification Search .......... 714/770, 714/758, 749, 742, 764, 774
See application file for complete search history.

(56) References Cited

U.S. PATENT DOCUMENTS

| | | | |
|---|---|---|---|
| 5,469,453 A | * | 11/1995 | Glider et al. .................. 714/6 |
| 5,758,054 A | * | 5/1998 | Katz et al. ..................... 714/22 |
| 6,467,060 B1 | * | 10/2002 | Malakapalli et al. ........ 714/758 |
| 2005/0138223 A1 | * | 6/2005 | Clifton et al. .................. 710/1 |

* cited by examiner

*Primary Examiner*—Esaw T Abraham
*Assistant Examiner*—Fritz Alphonse
(74) *Attorney, Agent, or Firm*—Patterson & Sheridan, LLP

(57) ABSTRACT

Method and apparatus for sending data from a disk drive as that data is being read. Error correction and checking is performed after the data is sent, followed by a calculation and transmission of communication cyclic redundancy check information. If error correction and checking identifies a problem, corrected replacement data is determined and sent. Data off-sets can be sent to inform the host system where the corrected data is to be applied.

14 Claims, 5 Drawing Sheets

POST-TRANSMISSION DISK ERROR CORRECTION

FIELD OF THE INVENTION

This invention generally relates to memory systems. More specifically, this invention relates to detecting and correcting disk errors after disk data has been sent to a host.

BACKGROUND OF THE INVENTION

Computers and other systems have used disk drives for many years to store digital information. This is because while computers and other systems may have sufficient host memory (such as random access memory) to perform ongoing computational tasks, storing large amounts of data, be it an operating system, application programs, or program data, is impractical using anything but a mass storage device such as a disk drive.

FIG. 1 illustrates a typical prior art computer system 100 that includes a main memory 102 for storing programs and data used by a processor 104. The system 100 further includes auxiliary systems that are generically shown as a chipset 106. The chipset 106 includes a host controller 108 that assists data integration with a disk drive 110. The disk drive 110 includes drive electronics 112 that includes a buffer memory 114. Typically, the buffer memory 114 is a dynamic random access memory (DRAM) of 2 MB-8 MB. Data is passed between the host controller 108 and the drive electronics 112 via a bi-directional bus 116. To enable integration of the various components of the system 100, that system operates under the control of an operating system 118.

While there are many types of disk drives 110, such as floppy disks and optical disks, probably the most widely used is the hard disk drive. A hard disk drive can record massive amounts of digital information on concentric memory tracks of magnetic medium placed on one or more disks. The digital information itself is recorded as magnetic transitions within the magnetic medium. FIG. 2 illustrates a typical disk 200 of a disk drive 110. That disk is divided into a plurality of sectors 205, only one of which is shown. The digital information is recorded in one or more of the sectors 205, with the actual location of the digital information being recorded on a table 210 located on a portion of the disk 200. In operation, disks are mounted on a spindle and turned at very high speeds by a spindle motor. Information on the disks is accessed using magnetic read/write heads located on pivoting arms that move over the disks.

Hard disk drives require more than just mechanical components. In fact, modern hard disk drives include sophisticated drive electronics that provide an interface for transmitting and receiving data to and from external devices, and a Head Disk Assembly Interface for interfacing the drive electronics to a head disk assembly. The head disk assembly includes the disks, the read/write head(s), the spindle motor that rotates the disks, a servo-operated actuator arm that moves the read/write head(s), and other disk drive components. The drive electronics also include servo drivers to move the actuator arms, motor drivers to drive the spindle motor, write drivers to drive the read/write head(s) to write data, an amplifier to amplify data being read, logic to determine where particular data is to be written to or read from, and data formatting to convert incoming data to the proper format for writing and for converting outgoing data to the proper format for the external system. Generally, the drive electronics are operated under the control of a processor.

The buffer memory 114 is used to temporarily store data. For example, data to be written may be temporarily stored in the buffer memory 114 until the read/write head(s) are moved to the correct write location(s), while data that has been read may be stored in the buffer memory 114 while data integrity checks are performed to ensure that the read data is good.

As disk drives 110 have developed their data density, that is, the amount of data stored per square millimeter, has increased dramatically. While this is highly beneficial from cost, size, and efficiency considerations, data errors have become more common. In fact, data errors are so common that cyclic redundancy check (CRC) codes are stored with the data and extensive error checking and correction (ECC) to both detect errors and to correct "fixable" errors is commonplace. Additionally, because of the speed of data transmissions, noise, and cabling issues, the use of cyclic redundancy check (CRC) codes to detect communication errors is also very common.

In the prior art, data is recovered and then sent after error checking and correction had been performed. The general process is to store data along with both error checking and correction and disk cyclic redundancy check data. Then, when reading data (either to obtain data or to ensure that the data that was written was written correctly) the data is obtained along with its cyclic redundancy check data. Then, error checking and correction is performed on the recovered data to verify that the read data is good and/or to correct that data. Then, the corrected data and communication CRC data are packaged together into a data packet and sent to the host controller 108. Thus, two types of CRC data were typically involved. First, disk CRC data stored with data on the disk to ensure viable data recovery, and then communication CRC data sent with the corrected data to ensure communication viability.

While generally successful, in the prior art data transfer did not occur until a whole sector 205 had been read and ECC and CRC processing were completed. This decreased data flow because of the need to access a complete sector of data before transmission.

Therefore, it would be beneficial to improve data flow from a disk drive to a host system by sending data as it is being read without having to wait to read a complete sector of data and to perform ECC and CRC processes.

SUMMARY OF THE INVENTION

Embodiments of the principles of the present invention provide for improve data flow from a disk drive to a host system by sending data as it is being read. Error correcting and checking is performed after the data has been sent to the host system. Any errors that occur during a read are identified, correct (replacement) data is determined, and that data is sent to the host system along with communication CRC data. In some systems, that data is sent with off-set instructions that inform the host system where the correct data is to replace defective data. Tag information that identifies a request can also be sent.

In some embodiments of the present invention, an out-of-order identifier identifies the replacement data as being provided out-of-order. In some embodiments, data off-sets are sent to inform the host system where the replacement data is to be applied.

BRIEF DESCRIPTION OF THE DRAWINGS

The principles of the present invention can be readily understood by considering the following detailed description in conjunction with the accompanying drawings, in which.

DETAILED DESCRIPTION OF THE PREFERRED EMBODIMENTS

The principles of the present invention provide for improved data flow from a disk drive to a host system by sending data as it is being read. Error correcting and checking is performed after data has been sent to the host system. Any errors that occur are identified and correct (replacement) data is determined and sent to the host system. In some embodiments the correct data is sent with off-set instructions that inform the host system where the correct data is to replace defective data.

In some embodiments of the present invention, an out-of-order identifier identifies the replacement data as being provided out-of-order. Data off-sets are sent to inform the host system where the replacement data is to be applied.

Figure 1:
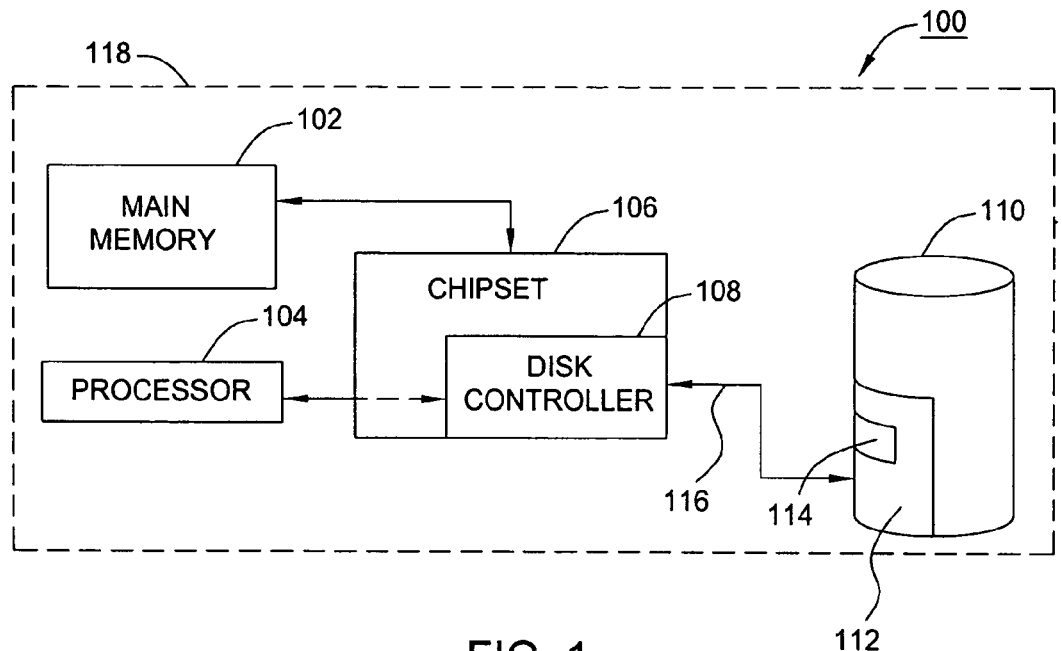
FIG. 1 illustrates a prior art system having host memory and a disk drive.
Figure 2:
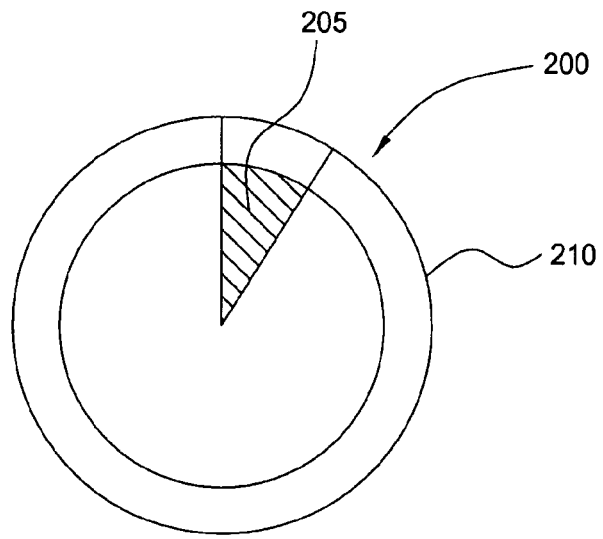
FIG. 2 illustrates a typical disk drive disk.
Figure 3:
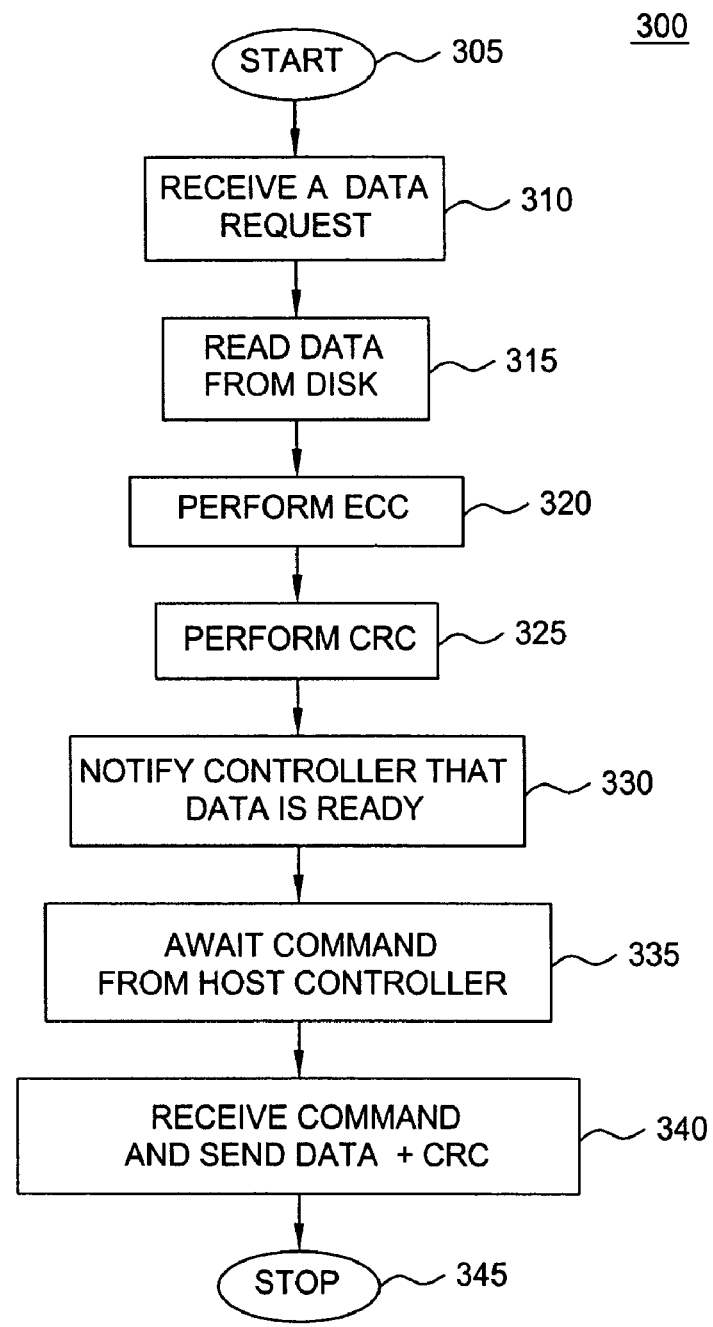
FIG. 3 illustrates a prior art method of reading data, performing ECC and CRC, and then sending that data to a host system.

In the prior art, read data is sent from the disk drive to the host system using a method 300 shown in FIG. 3. The method 300 starts at step 305 and proceeds at step 310 by data electronics 112 (see FIG. 1) receiving a data request from the host controller 108. At step 315, in response to the data request, the disk electronics 112 causes data and its associated disk ECC and CRC data to be read from the disk 200. At step 320, the disk electronics 112 performs error checking and correction on the data using the disk ECC and CRC data. If a problem is found, the disk electronics takes corrective action. Then, at step 325 the disk electronics computes communication CRC data. Then, at step 330 the disk electronics notifies the host controller 108 that data is ready. The disk electronics 112 waits at step 335 for a command from the host controller 108 to send data. At step 340, after a command to send data is received, the disk electronics 112 sends the data and the communication cyclic redundancy data to the host controller 108. At step 345, the method 300 ends.

Figure 4:
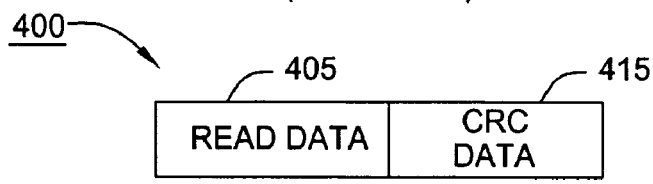
FIG. 4 illustrates a typical prior art data packet.

The method 300 has the drawback that data is sent to the host controller 108 only after all data has been read from a sector and after error correction and checking and cyclic redundancy computations are performed. FIG. 4 illustrates a typical prior art data packet sent by the disk electronics to the host controller. That data packet 400 includes the data 405 and the communication cyclic redundancy data 415.

Figure 5:
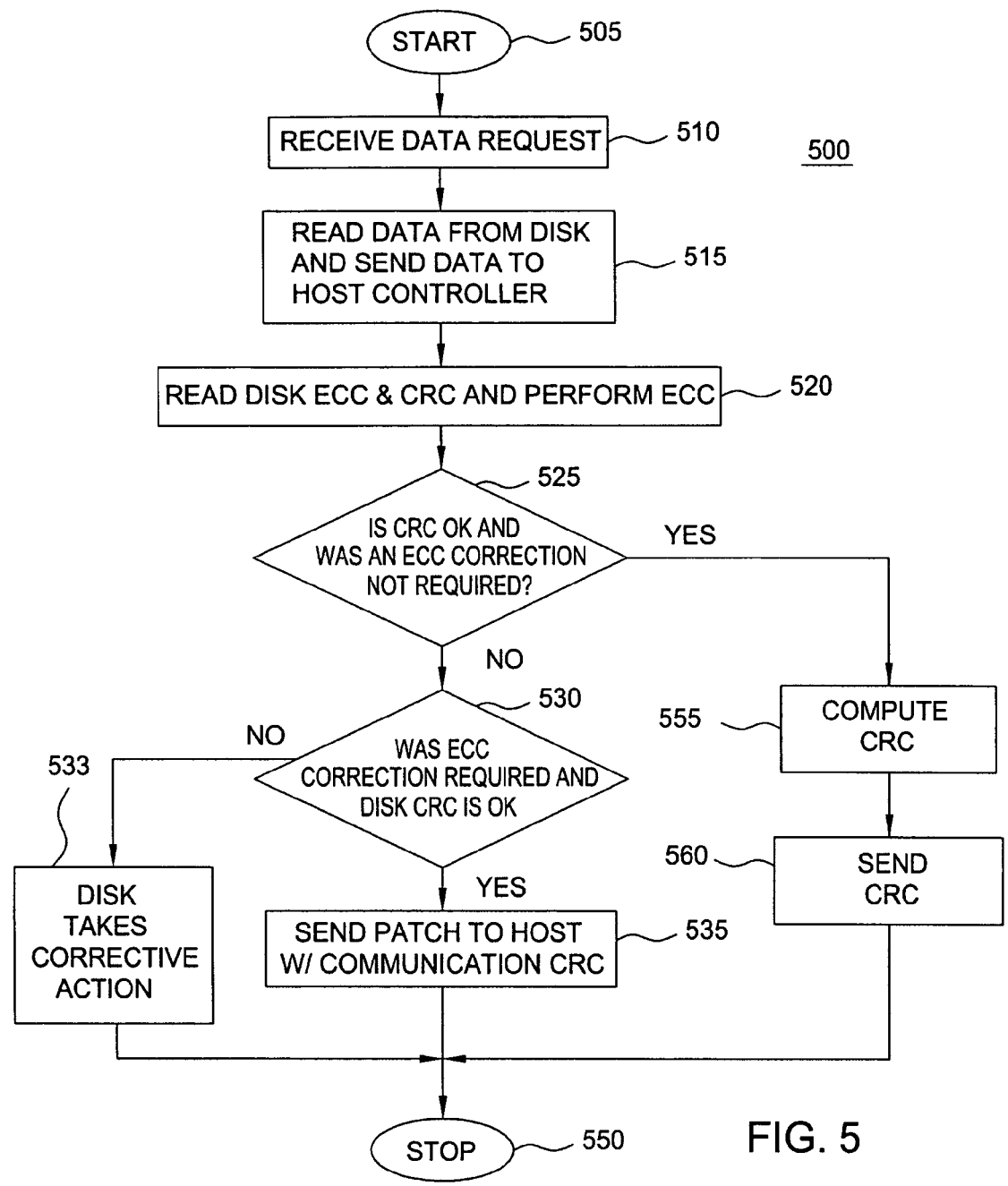
FIG. 5 illustrates a method of reading data, sending that data, performing ECC, computing CRC, and sending replacement data in accord with the principles of the present invention.

FIG. 5 illustrates a first method 500 of practicing the principles of the present invention. In the method 500 data is sent to a host controller as it is being read from a disk drive. The method 500 starts at step 505 and proceeds at step 510 by disk electronics receiving a data request from a host controller. In response, at step 515 the disk electronics causes the requested data to be read from the disk. As the requested data is being read it is transmitted to the host controller. Thus, data flows to the host controller as the data is being read. After all the data has been read, at step 520 the disk electronics reads the disk error correction and CRC data, and then performs error checking and correction on the data that was sent using disk ECC and disk CRC data. To enable this, a copy of the data that was sent is stored in buffer memory and the disk CRC data is recovered. Upon completion of error checking and correction, a determination is made at step 525 as to whether an error occurred, i.e. is the disk CRC correct and was an ECC correction not required. If there was no error, at step 555 the communication cyclic redundancy code is computed for the sent data and then at step 560 the cyclic redundancy data is sent to the host controller. The process 500 stops at step 550.

However, if at step 525 the determination is that something was wrong, at step 530 the disk electronics determines if an ECC correction was required and if disk CRC is correct. If so, the disk electronics produces a replacement patch of data and communication CRC data for that replacement data. Then, at step 535 the disk electronics sends that patch along with communication CRC data to the host controller and the process 500 stops at step 550. However, if at step 530 an ECC correction was not required or if disk CRC was not correct; at step 533 the disk takes correction action. For example, the disk could determine if the sector was defective or data can be re-read. Then, at step 550 the process stops.

The method 500 has an issue that may need to be addressed in some applications. Since data flows to the host controller as it is being read, the location of the defective data must be sent to the host controller. That enables the host controller to identify where the corrected data belongs and to prevent use of the corrupted data.

Figure 6:
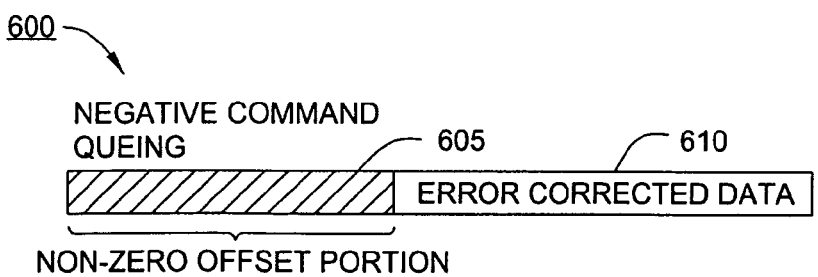
FIG. 6 illustrates a replacement data packet that is in accord with the principles of the present invention.

If the host controller is capable of out-of-order data transfers (multiple data transmissions can come in any order) a data packet 600 as shown in FIG. 6 is sent to the host controller. As shown, the data packet 600 is comprised of two portions. The first portion is a non-zero offset portion 605. This informs the host controller where the data that is being sent belongs. The data packet 600 also includes error corrected data 610.

Figure 7:
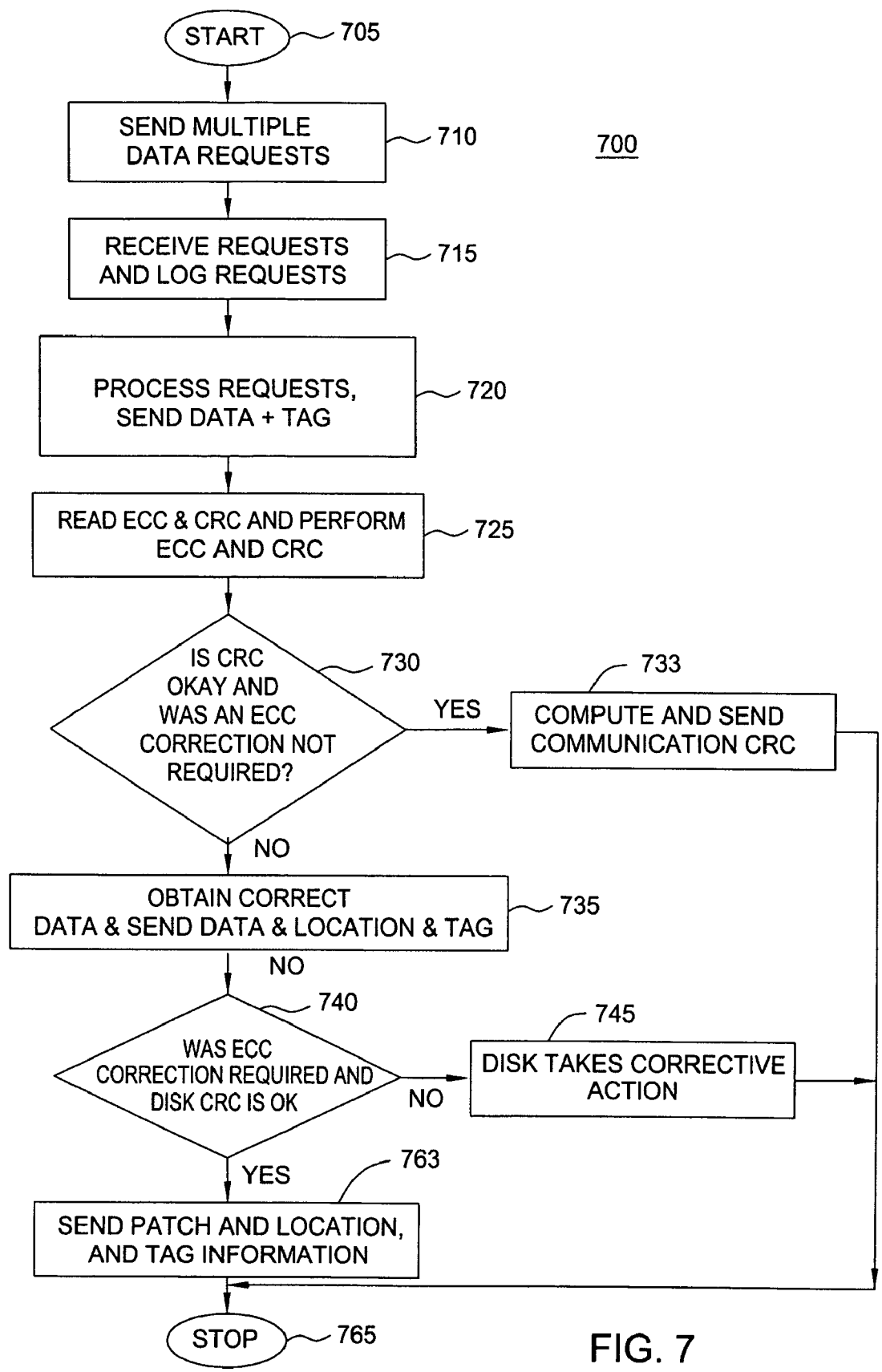
FIG. 7 illustrates another method of reading data, sending that data, performing ECC, computing CRC, and sending replacement data and CRC in accord with the principles of the present invention.

While the method 500 is beneficial, if the host controller can make multiple data read requests which the disk electronics can service in any order, the method 700, shown in FIG. 7, may offer improved performance. The method 700 starts at step 705 and proceeds at step 710 by the host controller sending multiple data requests. Then, at step 715 the disk electronics receives the multiple requests and logs them into a processing list. At step 720 the disk electronics begins processing those requests. Request processing is performed in any beneficial order. Typically, this is performed by the disk electronics reading data at the sector closest to the read/write head, and subsequently processing other requests based on the proximity of the sectors having the data to the read/write head. This increases the speed at which data is obtained by avoiding unnecessary movement of the read/write head.

As in the method 500, data is sent to the host controller as it is being obtained. To help the host controller match the incoming data to its requests, the disk electronics sends a tag identifier to the host controller to inform the host controller what data is being sent. As data flows to the host controller, the disk electronics stores a copy of that data in its buffer memory. Upon completion of a data send, at step 725 the disk electronics reads disk ECC and CRC data, performs error checking and correction on the sent data and determines the cyclic redundancy data. At step 730, a determination is made as to whether the CRC was okay and if an ECC correction was not required. If an error did not occur (uncorrupted data), the method 700 proceeds to step 733 where the communication cyclic redundancy data for the sent data is computed and sent to the host controller. The method then stops at step 765.

However, if an error was found at step 730, at step 740 a determination is made as to whether an ECC correction was required. If not, at step 745 the disk electronics takes corrective action. After corrective action, the method stops at step 765. Corrective action can include a data re-read and/or marking a sector as defective. However, if at step 740 an ECC correction was required, at step 763 the disk electronics sends a correction patch, the location of that patch, and tag information to identify that request to the host controller. The method then stops at step 765.

Figure 8:
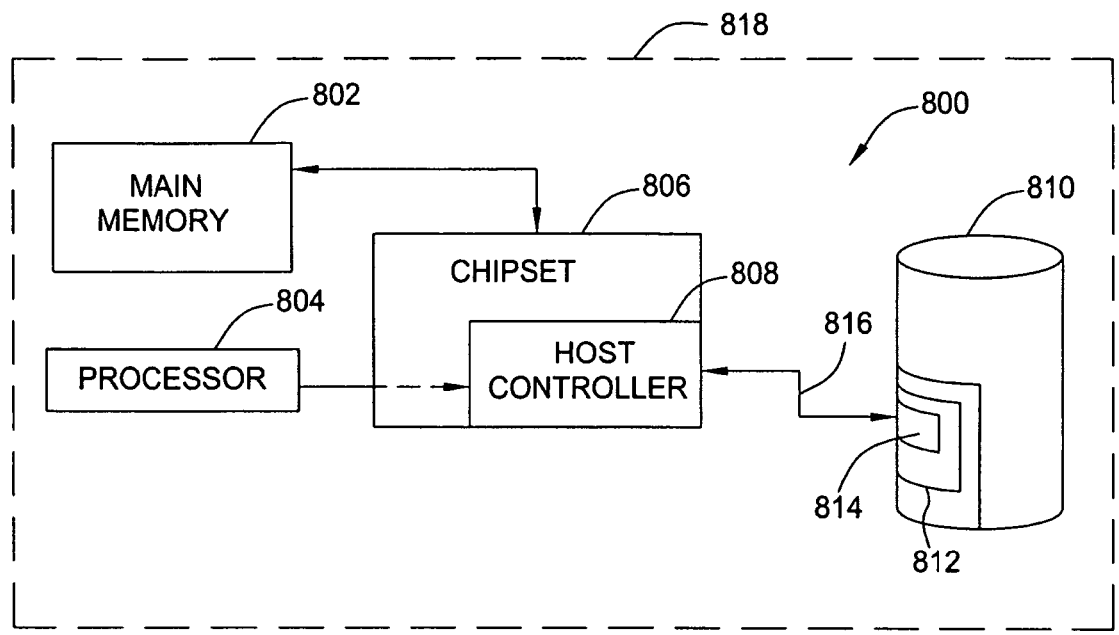
FIG. 8 illustrates an apparatus that is in accord with the principles of the present invention.

FIG. 8 illustrates a computer system 800 that is in accord with the principles of the present invention. That system includes a computer readable medium comprising a main memory 802 for storing programs and data used by a processor 804. In particular, the main memory 802 stores a program the causes the system to operate in accord with the principles of the present invention. The system 800 further includes auxiliary systems that are generically shown as a chipset 806. The chipset 806 includes a host controller 808 that assists data integration with a disk drive 810. The disk drive 810 includes drive electronics 812 that includes a buffer memory 814. Typically, the buffer memory 814 is a dynamic random access memory (DRAM) of 2 MB-8 MB. Data is passed between the host controller 808 and the drive electronics 812 via a bi-directional bus 816. To enable integration of the various components of the system 800, that system operates under the control of an operating system 818.

Figure 9:
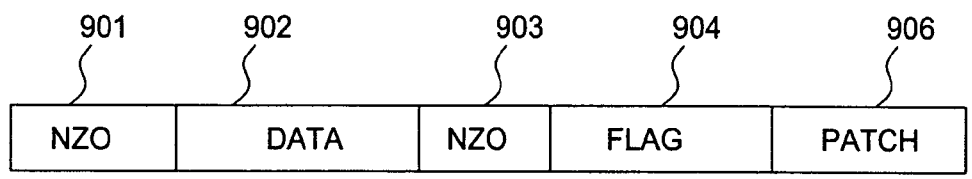
FIG. 9 illustrates a data packet that is sent to the host controller.

FIG. 9, which illustrates a data packet, is helpful in understanding the transmission of data to the host controller. Prior to the sending of current data a non-zero offset value 901 was sent (see below). Then, when servicing a request for data, that data 902 is sent to the host controller 808 as it is being read. If ECC found a problem that corrected data must be sent to the host controller. One way of doing so is to send a non-zero offset 903 after the data 902 is sent. The non-zero offset 903 informs the host controller where the corrected data patch that will be coming is to be used. This is followed by a flag 904 that indicates that the non-zero offset 903 relates to the location of data 902. Essentially, the flag 904 indicates that replacement data is coming. Then, the corrected data patch 906 is sent. The difference between the non-zero offset 901 and the non-zero offset 903 is that the flag 904 designates that replacement data will be coming, while without the flag the non-zero offset 901 operates as in the prior art.

In another embodiment, if there are no data corrections, nothing else follows the data 902 and that data is simply used. The state of a flag can be used to signal that replacement data is or is not coming.

In machines that do not use non-zero offsets, data transmission involves the disk electronics forming a data packet comprised of at least three elements. The first is the corrupted data 902 as it is being read from the disk. The second is a flag 903 having one of two states. One state informs the host controller that corrected data is not needed and thus, the next incoming data is associated with another read request. However, the other flag state indicates that the next data is a corrected patch data 906 that is to replace the corrupted data 902. In this embodiment, the non-zero offset 903 is not used.

Although the invention has been described with reference to preferred embodiments, workers skilled in the art will recognize that changes may be made in form and detail without departing from the spirit and scope of the invention. For example, the placement of one or more segmented or solid annular ring members as supports under the stator or in a supporting configuration of the stator can be configured in a variety of ways and can include a combination of the embodiments discussed above. The embodiments shown in the figures are provided by way of example only.

What is claimed is:

1. A method of operating a computer system to send data from at least one disk drive to a host, comprising the steps of:
   receiving a request for data;
   obtaining the requested data associated with the request from a storage device that includes at least one disk drive;
   sending the obtained data to the host;
   determining disk error correction and Cyclic Redundancy Check (CRC) data associated with each portion of the obtained data sent to the host;
   after sending the obtained data to the host, performing error checking and correction on the obtained data sent to the host using the disk error correction and CRC data; and
   if a data error is found, sending corrected data to the host along with an offset to identify that the obtained data sent to the host should be replaced by the corrected data, or
   if no data error is found, computing and sending CRC to the host for all obtained data sent to the host.

2. The method of claim 1, further including the step of computing communication cyclic redundancy data for the corrected data.

3. The method of claim 2, wherein communication cyclic redundancy data is sent with the corrected data.

4. The method of claim 1, further including the step of sending tag information.

5. The method of claim 1, further including:
   receiving a plurality of requests for data; and
   obtaining the requested data associated with the plurality of requests in an order based on a proximity of the requested data to a read/write head.

6. A system, comprising:
   a processor operating in accord with an operating program;
   a host controller responsive to the processor for sending a request for data; and
   a disk drive having disk electronics for receiving the request for data;
   wherein the disk electronics recovers the requested data from a storage medium that includes at least one disk drive and sends the requested data to the host controller;
   wherein the disk electronics further obtains disk error correction and cyclic redundancy check (CRC) data and, after sending the recovered data to the host controller, performs error checking and correction on the sent data to determine if the sent data was corrupted;
   wherein the disk electronics obtains corrected data if the sent data is determined to be corrupted; and
   wherein if corrupted data is found the disk electronics sends the corrected data to the host controller along with an offset to identify that the sent data should be replaced by the corrected data, or
   if no corrupted data is found, computing and sending CRC to the host controller for all sent data to the host controller.

7. The system of claim 6, wherein the disk electronics computes communication cyclic redundancy data for the corrected data.

8. The system of claim 7, wherein the disk electronics sends the communication cyclic redundancy data with the corrected data.

9. The system of claim 6, wherein the disk electronics obtains new data during error checking and correction.

10. The system of claim 6, wherein the disk electronics sends communication cyclic redundancy data after the sent data if the sent data is not determined to be corrupted.

11. A computer readable medium storing instructions that, when executed by a processor, causes a computer system to send data from a disk drive to a host, by performing the steps of:

receiving a request for data;

obtaining the requested data associated with the request from a storage device that includes at least one disk drive;

sending the obtained data to the host;

determining disk error correction Cyclic Redundancy Check (CRC) data associated with each portion of the obtained data sent to the host;

after sending the obtained data to the host, performing error checking and correction on the obtained data sent to the host using the disk error correction and CRC data; and if a data error is found, sending corrected data to the host along with an offset to identify that the obtained data sent to the host should be replaced by the corrected data, or if no data error is found, computing and sending CRC to the host for all obtained data sent to the host.

12. The computer readable medium of claim 11, further including performing the step of computing communication cyclic redundancy data for the corrected data.

13. The computer readable medium of claim 12, wherein communication cyclic redundancy data is sent with the corrected data.

14. The computer readable medium of claim 11, further including the step of sending tag information.

* * * * *